United States Patent [19]

Dewire et al.

[11] Patent Number: 5,007,178
[45] Date of Patent: Apr. 16, 1991

[54] MEASURING TAPE DEVICE

[75] Inventors: Robert J. Dewire, Naperville; Walter A. Kozlowski, Schaumburg, both of Ill.

[73] Assignee: Sears, Roebuck & Co., Chicago, Ill.

[21] Appl. No.: 374,005

[22] Filed: Jun. 29, 1989

[51] Int. Cl.$^5$ .............................................. G01B 3/10
[52] U.S. Cl. .................................... 33/767; 33/754
[58] Field of Search ............ 33/730, 754, 761, 765, 33/767, 740, 768, 769; 242/107.6, 84.8, 107.12, 107.3, 107.15; 411/500, 501, 503

[56] References Cited

U.S. PATENT DOCUMENTS

| | | | |
|---|---|---|---|
| 2,893,656 | 7/1959 | Carlson | 242/84.8 |
| 3,164,907 | 1/1965 | Quenot | 33/767 |
| 3,214,836 | 11/1965 | West | 242/107.3 |
| 4,029,426 | 6/1977 | Sims, Jr. | 411/500 |
| 4,153,996 | 5/1979 | Rutty | 242/84.8 |
| 4,194,703 | 3/1980 | Roe | 242/107.3 |

Primary Examiner—Allan N. Shoap
Assistant Examiner—Daniel G. DePumpo
Attorney, Agent, or Firm—Wood, Phillips, Mason, Recktenwald & Vansanten

[57] ABSTRACT

A measuring tape device which includes a casing having an aperture through which a coilable measuring tape can be extracted and retracted. A coilable measuring tape is disposed in the casing with a distal end projecting from the aperture. A first brake mechanism is mounted on the casing for normally applying a controlled drag on the tape which allows the tape to be extracted or retracted against the drag to any given length and held at that length. A second brake mechanism is mounted on the casing and is selectively operable for applying a positive lock on the tape greater in magnitude than the drag of the first brake mechanism, to prevent accidental extraction or retraction of the tape.

10 Claims, 4 Drawing Sheets

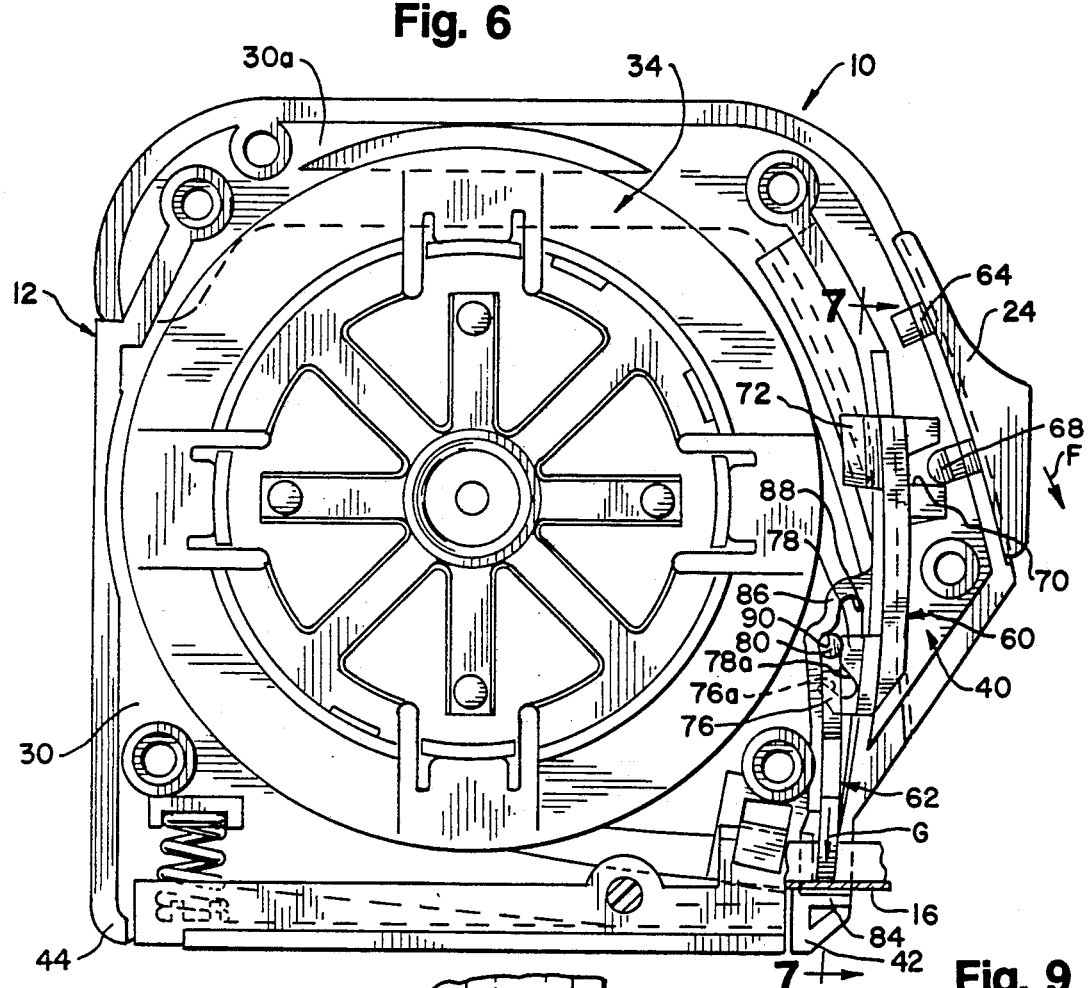
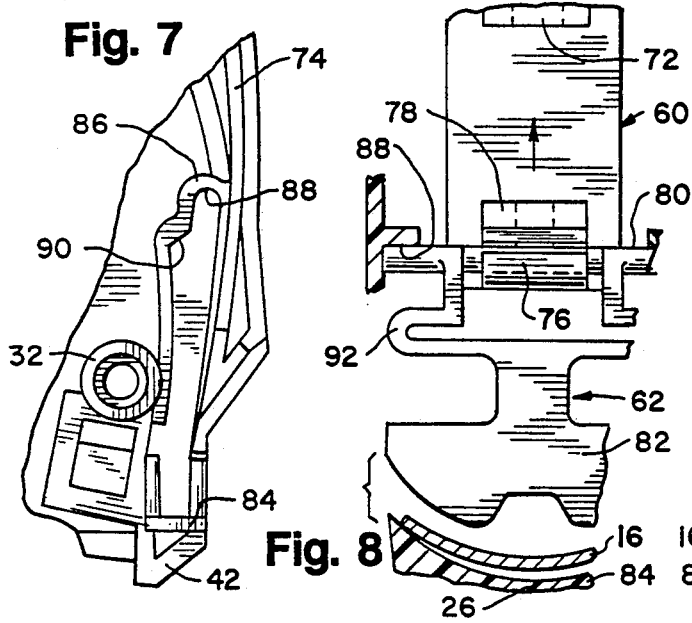
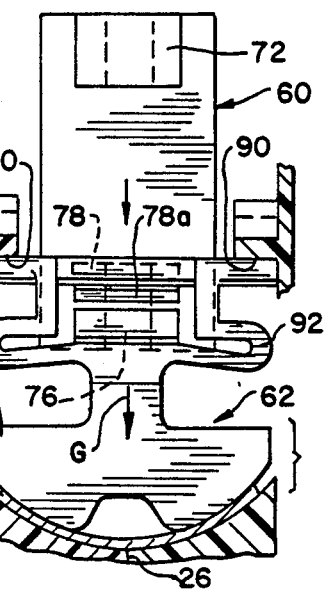

MEASURING TAPE DEVICE

FIELD OF THE INVENTION

This invention generally relates to measuring tape devices and, particularly, to a measuring tape device which has a dual-brake system.

BACKGROUND OF THE INVENTION

Measuring tape devices which have a measuring tape coiled within a casing having an aperture through which the tape can be extracted and retracted have been known for years. In many such measuring tape devices, the coilable tape is spring-loaded to be biased toward a retracted condition. Some devices have various types of brake or locking mechanisms operatively associated with the tape to hold the tape in any given extended position. The locking mechanisms usually operate on the tape within the casing, and an actuator, such as a slide or push button, is exposed exteriorly of the casing. Upon actuating the slide or push button, the tape is locked in a given extended position, and upon releasing the slide or push button the tape is retracted automatically into the casing under the influence of its spring loading.

Other such measuring tape devices have a brake mechanism which, in normal condition, applies a limited brake or a drag on the tape. Again, operative components of the brake mechanism are disposed within the casing, and an actuator is exposed exteriorly of the casing for actuation by a user. During use, the tape is extracted from the casing against a predetermined load or drag applied by the brake mechanism. For instance, the drag may be determined by an internal spring. Upon movement of the actuator, the drag is released and the tape retracts automatically into the casing under the influence of its spring loading.

Heretofore, whenever a measuring tape device has incorporated a brake mechanism, it generally has been one or the other of the two forms described above. In other words, either the device had a positive brake which applied a considerable load on the tape to positively lock the tape in a given position of extension which does not enable the user to readily extract the tape in a controlled fashion, or the device had a brake mechanism which applied a lesser drag on the tape for controlled manipulation but the drag was insufficient to positively lock the tape once a precise measurement is made. These limitations on the different types of brake mechanisms have inhibited their use by skilled craftsmen.

Skilled craftsmen such as carpenters, wall paper hangers, tile layers, electricians, plumbers and the like use a coilable measuring tape device in a wide range of circumstances wherein both a positive brake and a controlled drag would be highly advantageous but heretofore has not been available.

For instance, tile layers most often use a measuring tape device which has a brake mechanism for applying a controlled drag on the tape whereby very precise measurements can be made. The device actually becomes a form of template (i.e. length) and may even be extended over a surface to which adhesive has been applied. In using a device which only has a brake mechanism with a controlled drag to obtain a precise measurement, the controlled drag is too easily overcome by accident in moving from one area of a floor to another area and the precise measurement or template length is lost, whereupon the measurement has to be retaken or, if not discovered, misalignment of the tile will occur. On the other hand, if a measuring tape device having only a brake mechanism which applies a strong positive lock on the tape is used, precise measurements are difficult to obtain because the tape is constantly being biased toward its retracted condition under the influence of its spring loading. Usually, the craftsman has to use two hands or the tape may get out of control and wipe over the adhesive, resulting in lost time if not destruction of the device itself because of adhesive getting into the internal mechanisms.

Carpenters use measuring tape devices in many applications which are not common to an ordinary user. In just one example, a carpenter may be measuring downward from an elevated position. Such a craftsman, contrary to an ordinary layman, using a measuring tape device with a brake mechanism having a controlled drag, will grasp the distal end of the tape itself and shake the device whereupon the casing, through its own weight, will descend to a lower position. The craftsman then will latch the casing itself under some structure from which a measurement is to be made, check the "top" or distal end of the tape, and then lift the casing to read and thereby calculate his precise measurement for repeating that measurement downline of the structure, having to go to considerable effort to insure that the measurement is not lost. This would be impossible with a device which incorporates a brake mechanism having only a positive brake. If that same device with its controlled drag mechanism also had a positive brake mechanism, the carpenter could set the device to the precise measurement and repeat the measurement downline of the structure without concern that the measurement will be lost in the process. Heretofore, this could not be done.

Still another example of the problems with available measuring tape devices can be exemplified with a craftsman who hangs wallpaper and, again, often uses a measuring tape device as a tool for purposes beyond mere measuring lengths. This craftsman, of course, often uses a measuring tape device for measuring the length of strips of wallpaper. A device with a brake mechanism having only a positive lock might be used because it can be set to consistently measure repeated lengths of wallpaper with minimal chance of accidentally losing the measurement. However, an experienced craftsman more likely would use a device with a brake device having a given drag because he also uses the tape itself to establish plumb lines as he hangs the paper. In other words, the skilled craftsman again would grasp the distal end of the tape itself at the top of a wall and allow the tape to hang by gravity under the weight of the casing. If the casing does not reach all the way to the bottom of the wall, he might shake the tape in a vertical direction so that the casing will bounce and "extract" relative to the tape against the drag until the tape is extended from the casing a sufficient distance This procedure could not be performed with a device having only a brake mechanism with a positive drag, yet, again, the craftsman runs the risk of losing his measurement without a positive lock. It can be seen that this dilemma continues in all kinds of fields of expertise and examples can be given practically "ad infinitum".

This invention is directed to providing a measuring tape device of the character described which solves the above and many other problems in a wide variety of trades and to satisfy the need for a novel measuring tape device having a dual brake or lock system.

SUMMARY OF THE INVENTION

An object, therefore, of the invention is to provide a new and improved measuring tape device which has a braking system in a single device which provides for both a controlled drag on the tape as well as a positive grip or lock on the tape.

In the exemplary embodiment of the invention, the measuring tape device includes a casing having an aperture through which a coilable measuring tape can be extracted and retracted. A coilable measuring tape is disposed in the casing with a distal end projecting from the aperture. A first brake mechanism is mounted on the casing for normally applying a controlled drag on the tape which allows the tape to be extracted or retracted against the drag to any given length and held at that length. A second brake mechanism is mounted on the casing and is selectively operable for applying a positive lock on the tape greater in magnitude than the drag of the first brake mechanism to prevent accidental extraction or retraction of the tape.

In the preferred embodiment, the tape is spring loaded to be biased toward a retracted condition within the casing. The first brake mechanism includes an actuator member exposed exteriorly of the casing, the actuator being spring biased toward an extended position wherein the drag is applied to the tape. The actuator is depressible against the spring bias to release the drag on the tape whereby the tape will retract automatically into the casing under the influence of its spring loading.

The casing is of a size and shape for grasping in the palm of a user's hand with the user's fingers wrapped around the bottom area of the casing and the user's thumb overlying a top/front area of the casing. The actuator for the first brake mechanism is exposed exteriorly of the casing in that bottom area, and the second brake mechanism includes an actuator in the form of a slide button exposed exteriorly of the casing in the top/front area thereof for convenient movement by the user's thumb.

A feature of the invention is to dispose the actuator for the first brake mechanism in a recessed area at the bottom of the casing so that the tape will not be accidentally released when the device is placed on a supporting surface. Particularly, foot means project from a flat bottom wall of the casing adjacent the depressible actuator of the first brake mechanism to prevent accidental depression of the actuator.

Another feature of the invention is to provide aperture means through the tape near its distal end whereby the device can be hung from a support member, such as a nail, projecting through the aperture. Particularly, the tape has a hook member secured to the distal end of the tape by rivets. At least one of the rivets is a hollow rivet and, itself, forms the aperture for hanging the tape. An example of such usage is with the wallpaper hanging craftsman described above, wherein the tape can be hung from a nail extending through the aperture, and the depending tape can be used to establish a plumb line for hanging the paper.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 6 is a view similar to that of FIGS. 2 and 4, with the first brake mechanism in the same condition as FIG. 2, but with the second brake mechanism having been selectively actuated to apply a positive lock on the tape;

FIG. 7 is a fragmented vertical section taken generally along line 7—7 of FIG. 6, showing certain integrally molded components of the casing for cooperating the second brake mechanism;

FIG. 8 is a fragmented vertical section, on an enlarged scale, taken generally along line 8—8 of FIG. 2, showing certain components of the second brake mechanism in inoperative condition;

FIG. 9 is a view similar to that of FIG. 8, with the components of the second brake mechanism applying a positive lock against the tape.

DETAILED DESCRIPTION OF THE PREFERRED EMBODIMENT

Figure 1:
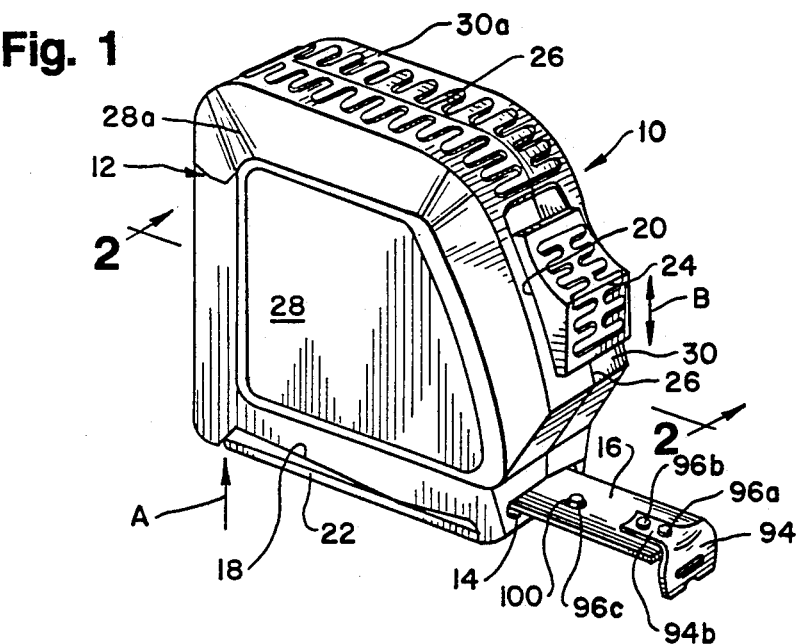
FIG. 1 is a perspective view of a measuring tape device incorporating the concepts of the invention, with the measuring tape slightly extracted from the casing.

Referring to the drawings in greater detail, and first to FIG. 1, the invention is incorporated in a measuring tape device, generally designated 10, which includes a casing, generally designated 12, having an aperture 14 through which a coilable measuring tape 16 can be extracted and retracted. Casing 12 is of a size and shape for grasping in the palm of a user's hand with the user's fingers wrapped around a bottom area 18 of the casing and the user's thumb overlying a top/front area 20 of the casing.

Generally, the invention contemplates measuring tape device 10 to include a first brake mechanism for applying a controlled drag on tape 16, and a second brake mechanism for applying a positive lock on the tape. Details of the brake mechanisms will be described hereinafter. However, still referring to FIG. 1, the first brake mechanism includes a lever-type actuator 22 exposed exteriorly of casing 12 in bottom area 18 of the casing for depressing by a user's fingers. The second brake mechanism includes an actuator 24 in the form of a slide button exposed exteriorly of the casing in the top/front area thereof. Actuator lever 22 is depressible by the user's fingers in the direction of arrow "A", and slide button 24 is slidable by the user's thumb in the direction of double-headed arrow "B".

Casing 12 is formed as a split-type housing along a generally central parting line 26, as is known in the measuring tape art. This facilitates assembly of the device, as well as subsequent disassembly for cleaning or repair purposes. The split casing forms a front casing half 28 and a rear casing half 30. Actually, as will be seen hereinafter, both the front and rear casing halves are formed with two parts, including a front casing cap 28a and a rear casing cap 30a. The two halves of the casing are secured together by conventional screw fasteners, as is well known in the art, but which cannot be seen in FIG. 1 because, as is most often designed, the screw fasteners project through the rear casing half for threading into internal bosses in the front casing half by screwdriver type tools or the like.

Figure 2:
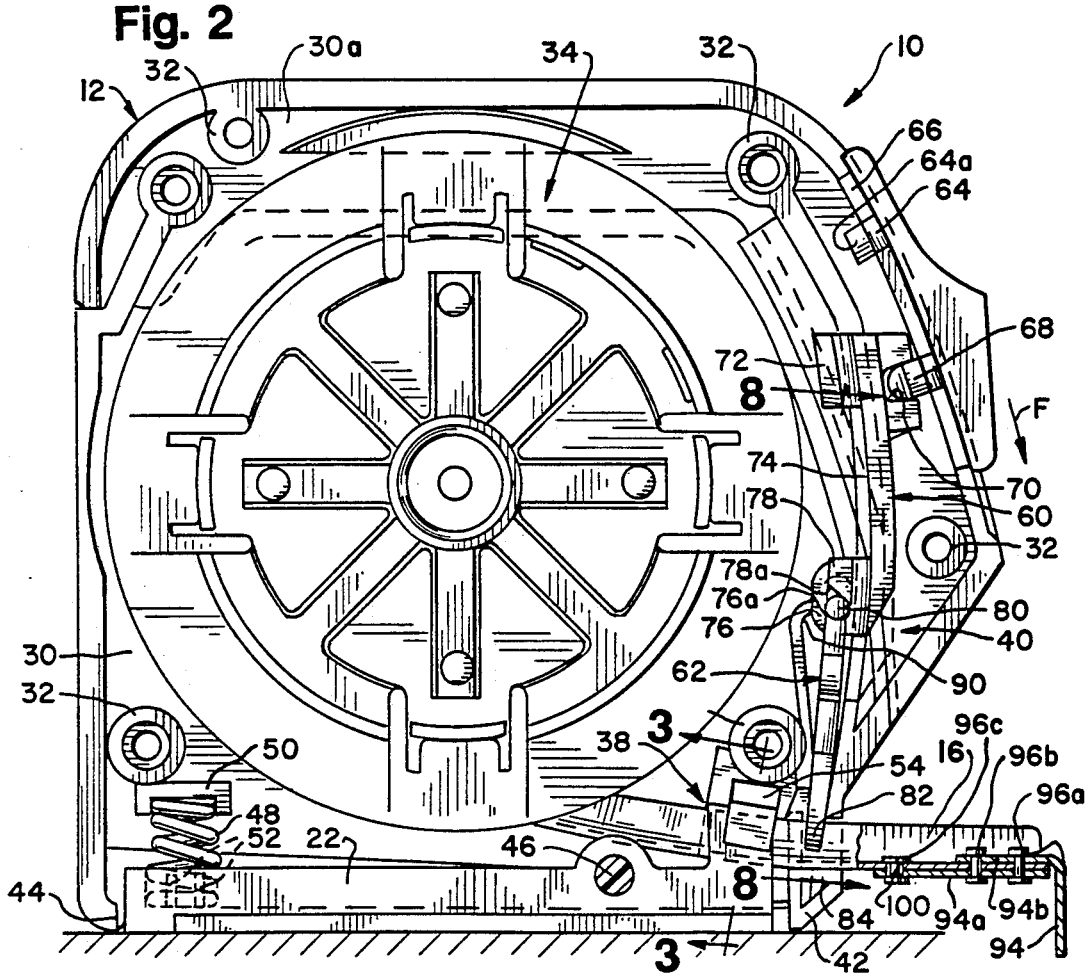
FIG. 2 is a vertical section, on an enlarged scale, taken generally along line 2—2 of FIG. 1, with the first brake mechanism in normal condition applying a controlled drag on the tape, and the second brake mechanism in normal condition completely out of operative association with the tape.

Referring to FIG. 2, the interior of rear casing half 30, including its cap 30a, is shown and illustrates the interior components of the device, including the components of the first and second brake mechanisms. Preferably, all four casing components 28, 28a, 30 and 30a are molded of plastic material whereby various bosses, flanges, slide rails, positioning means for various components, and the like can be molded integrally on the interior of the casing without requiring countless separate parts. For instance, cylindrical bosses 32 are shown molded integrally with rear casing components 30,30a through which the screw fasteners project for threading into mating internally threaded bosses formed integrally on the interior of the front casing components.

Measuring tape 16, itself, is of conventional design and is bowed to provide inherent stiffness. As has become convenient in manufacturing such devices, the tape is wound on a spool package, generally designated 34, which, for sufficient purposes herein, will be described only to the extent that such spool packages incorporate spring means whereby the tape is spring loaded to be biased toward a retracted condition within casing 12, coiled onto the spool package. The spool itself is positioned onto a cylindrical boss 36 molded integrally with and projecting interiorly of rear casing half 28. This type of automatically retractable, spring loaded coilable tape has been known in the industry for many years.

Still referring to FIG. 2, as stated above, it is contemplated that measuring tape device 10 include a first brake mechanism, generally designated 38, for applying a controlled drag on tape 16, and a second brake mechanism, generally designated 40, for applying a positive lock on the tape. First brake mechanism 38 is actuated by depressible lever 22, and second brake mechanism 40 is actuated by slide button 24.

First brake mechanism 38 is shown in FIG. 2 in normal operative condition for applying a controlled drag on tape 16 which allows the tape to be extracted or retracted against the drag to any given length and held at that length. It can be seen that actuator lever 22 is in a position substantially flush with the bottom of the wall means which defines the casing of the device. Actually, in this condition, the actuator lever is in an "extended position", as will be understood hereinafter. However, in this position, actuator lever 22 actually is recessed within the bounds of the casing as defined by front wall means 42 of the casing and rear foot means 44 of the casing. Therefore, when the device is placed on a supporting surface, such as a floor, a ledge, or whatever, with the device oriented as shown in FIG. 1, foot means 44 prevent any accidental depression of actuator lever 22. This might happen, for instance, should the user place the tape on top of a surface to make a measurement, and then lean on top of the tape as is easily understandable. This is a continuing problem with such measuring tape devices heretofore available.

Actuator lever 22 of first brake mechanism 38 is pivotally mounted on a shaft 46 molded integrally with and projecting interiorly of front casing 28. That is why it is shown in section in FIG. 2. A coil spring 48 is maintained under compression between a cap like retainer 50 molded integrally with casing half 30 and projections 52 on the top of actuator lever 22. This biases an opposite end of actuator lever 22, on the opposite side of pivot 46, upwardly in the direction of arrow "C".

Figure 3:
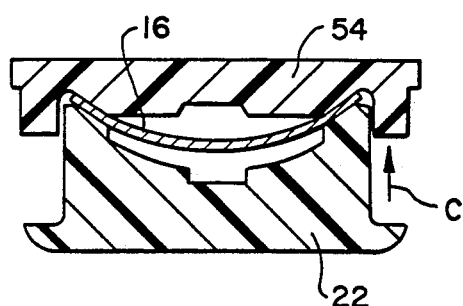
FIG. 3 is a vertical section taken generally along line 3—3 of FIG. 2, showing components of the first brake mechanism applying a drag to the tape.

Referring to FIG. 3 in conjunction with FIG. 2, an anvil member 54 is positioned within the casing between the front and rear halves thereof whereby tape 16 is sandwiched between the anvil member and actuator lever 22 when the lever is biased by coil spring 48 in the direction of arrow "C", as described above. Anvil member 54 is rigidly backed by one of the fastener bosses 32, as seen in FIG. 3, and is retained against slipping movement by integrally molded ribs on the inside of front casing half 28, but which are not shown in FIG. 2.

As stated, the condition of first brake mechanism 38 and actuator lever 22 in FIGS. 2 and 3 is such as to normally apply a controlled drag on tape 16. This drag is predetermined according to a particularly design, as desired. It can be seen in FIG. 3 that tape 16 is sandwiched between anvil member 54 and actuator lever 22 only along its outside, limited parallel edges. This limited surface area of engagement, along with the compression forces of coil spring 48, in combination with the moment arms of actuator lever 22 on opposite sides of pivot 46 are factors which go into the design of a particular predetermined drag against the tape.

Figure 4:
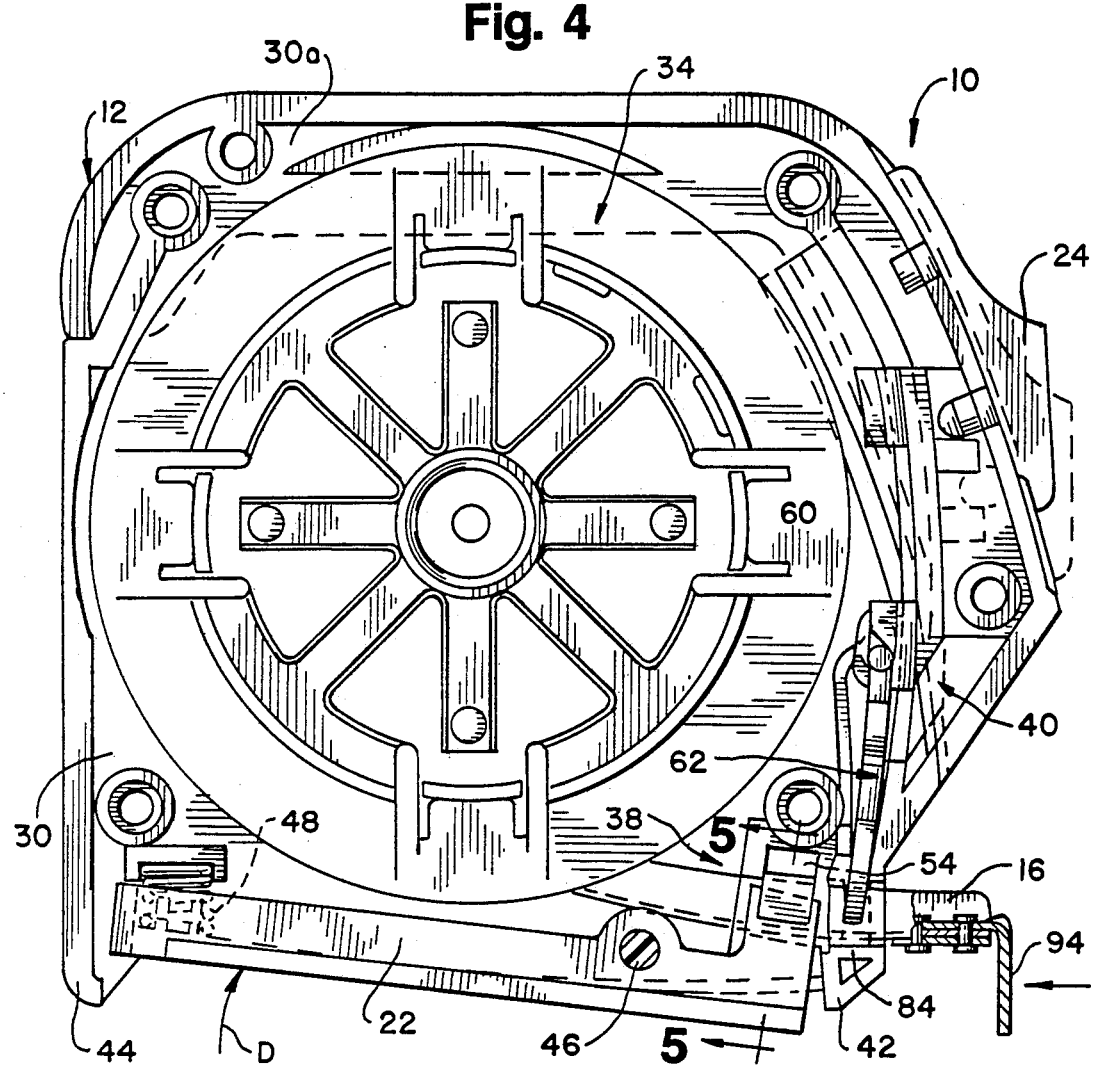
FIG. 4 is a view similar to that of FIG. 2, but with the actuator for the first brake mechanism being depressed to release the drag on the tape.
Figure 5:
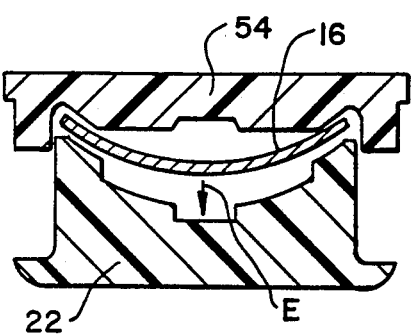
FIG. 5 is a view similar to that of FIG. 3, taken generally along line 5—5 of FIG. 4, showing the components of the first brake mechanism releasing the drag on the brake.

Referring to FIGS. 4 and 5, these illustrations shown the condition of first brake mechanism 38 and actuator lever 22 when a user depresses the actuator lever in the direction of arrow "D" (FIG. 4) to release the drag on the tape. Once the drag is released, the tape will automatically retract into casing 12 under its spring loading onto spool package 34.

In particular, it can be seen in FIG. 4 that actuator lever 22 has compressed coil spring 48 and has moved the opposite end of the actuator lever, on the opposite side of pivot 46, downwardly in the direction of arrow "E", opposite arrow "C" in FIG. 2. As seen in FIG. 5, this moves actuator lever 22 away from anvil member 44, completely freeing tape 16, whereby the tape automatically retracts into the casing under its spring loading.

Figure 10:
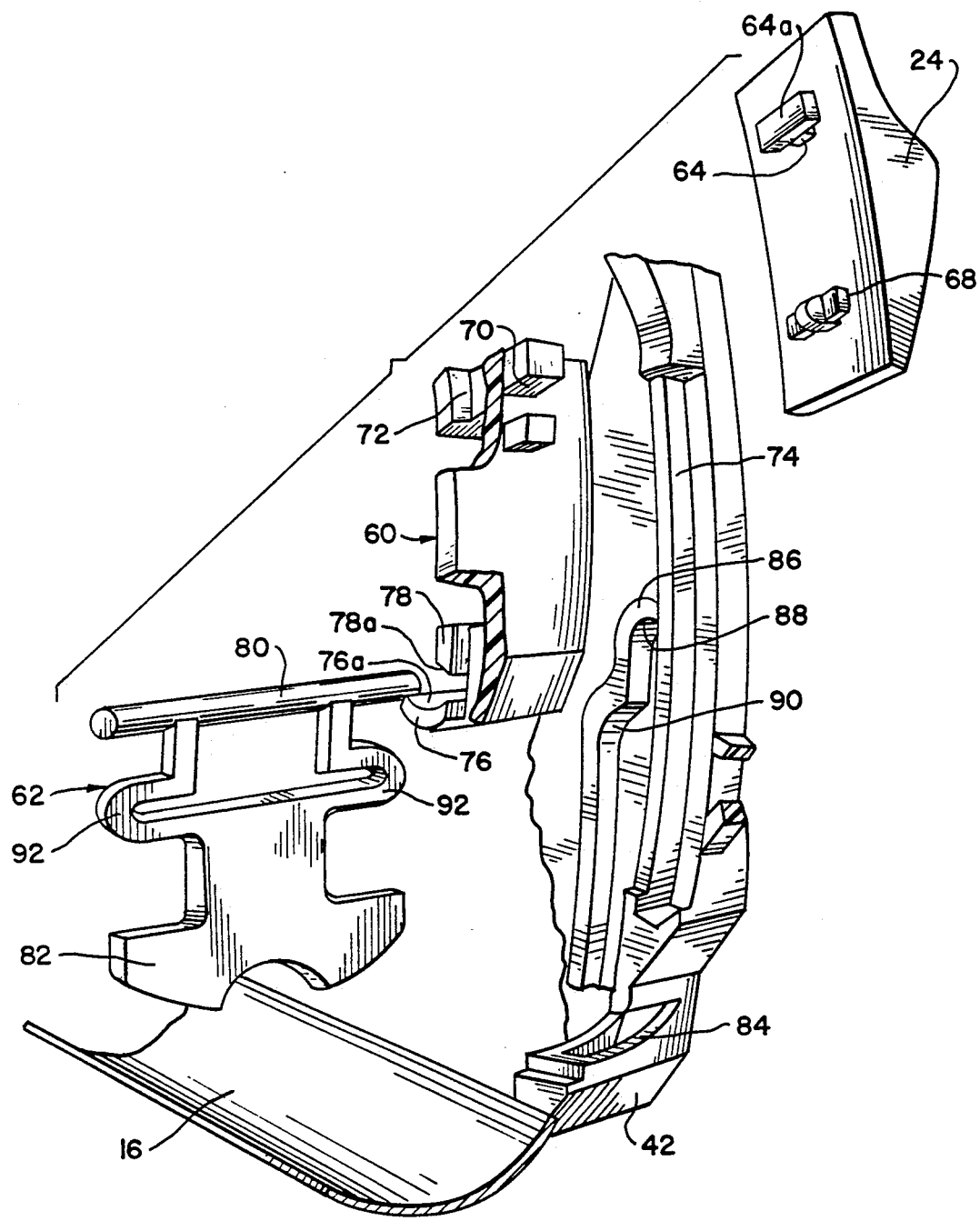
FIG. 10 is an exploded perspective view of the components of the second brake mechanism.

Referring back to FIG. 2 in conjunction with the exploded view of FIG. 10, second brake mechanism 40, as stated above, is provided to be selectively operable for applying a positive lock on tape 16 under a force greater in magnitude than the drag applied by first brake mechanism 38, to prevent accidental retracting of the tape. In particular, slide button 24 is moved downwardly in the direction of arrow "F" to apply the positive lock on the tape. The slide button operates on an interior slide member, generally designated 60, which, in turn, operates on a force applying member, generally designated 62, which directly engages tape 16, as described hereinafter.

More specifically, slide button 24 has an inwardly projecting T-shaped boss 64 which projects through a slot 66 at the parting line 26 (FIG. 1) of the split casing. The cross or head portion 64a of the T-shaped projection is wider than slot 26 to maintain slide button 24 in position and to guide movement of the slide button as indicated by double-headed "B" (FIG. 1). The slide button has a second inwardly projecting boss 68 which protrudes into a notch 70 at the top of slide member 60. Like the slide button, slide member 60 has a rearwardly projecting T-shaped boss 72 which slides internally molded flanges 74 on casing caps 28a,30a. By using both a slide button 24 and a slide member 60, a lost-motion connection is provided by boss 68 freely extending into notch 70, thereby providing freer movement without jamming than might be afforded by a single, unitary member.

Referring to FIGS. 7-10 in conjunction with FIG. 2, the lower end of slide member 60 is provided with an integrally molded configuration which includes a bottom hook member 76 and a top keeper member 78 which define a slot therebetween. Actually, the slot is defined by a slanted cam surface 78a on keeper 78 and a hook surface 76a on hook 76. A cross rod 80 at the top of force applying member 62 is disposed in this slot when the second brake mechanism 40 is in inoperable condition as shown in FIG. 2, with slide button 24 in its upper position and a lower end 82 of force applying member 62 is spaced away from tape 16. In this condition (FIG. 2), measuring tape device 10 is operated by a user substantially through the functioning of first brake mechanism 30 and actuator lever 22 in a "drag" mode of operation.

When it is desirable to apply a positive lock on tape 16, and referring to FIGS. 6-10, slide button 24 is moved downwardly in the direction of arrow "F" (FIG. 6) which, in turn, moves slide member 40 and force applying member 62 downwardly in the direction of arrow "G". As seen in FIG. 7, this movement causes lower end 82 of force applying member 62 to move downwardly and force tape 16 against an anvil member 84 molded integrally with the split casing halves.

As seen best in FIGS. 2 and 10, stepped flange means 86 are molded integrally with both split casing halves 28 and 30 to define a first notch 88 and a second notch 90. Although not as clear in FIG. 2, cross rod 80 is disposed in notch 88 when second brake mechanism 40 is in its inoperable condition. However, when slide button 24 and slide member 40 are moved downwardly to the locking position as shown in FIG. 6, cross rod 80 is biased into notch 90. This is effected by angled cam surface 78a of keeper 78 biasing the rod inwardly into notch 90. Once in the notch, keeper 78, itself, forms an abutment to prevent the rod from moving out of the notch, as can be seen in FIG. 6. When it is desired to release the positive lock applied by first brake mechanism 40, slide button 24 is moved back upwardly, opposite the direction of arrow "F" whereupon surface 76a of hook 78 engages the underside of rod 80, pulls the rod out of notch 90 whereupon the entire force applying member 62 is pulled upwardly with slide member 40 and slide button 24. The positive lock on tape 16 now is released.

As seen best in FIGS. 8 and 9, the lower end 82 of the force applying member is substantially solid for applying a solid force against tape 16 over a considerably larger surface area then as depicted with the drag applying components in FIG. 3. Cross rod 80 is connected to lower end 82 by outwardly bowed portions 92 which are of integrally molded plastic material whereby the entire force applying member 62 is an integrally molded, unitary structure. These bowed portions 92 define an integral spring means for applying a considerable force. Of course, the stiffness of the plastic material is a controlling factor for the stiffness of the bowed portions. In designing such a measuring tape device, some movement of the tape should be allowed to prevent breaking the tape itself, but this locking force should be of sufficient magnitude so that a craftsman can move the tape only when it is clearly intentional. In any event, the locking force should be of a considerably greater magnitude than the drag applied by first brake mechanism 38 whereby a craftsman can use the first brake mechanism to easily arrive at a given measurement, to hold that measurement sufficiently until that positive lock of second brake mechanism 40 is applied to prevent any accidental loss of that precise measurement.

As stated above, another feature of the invention is to provide means by which the distal end of tape 16 can be used to hang the entire measuring tape device so that the device can be used in various ways, such as arriving at a plumb line by a craftsman hanging wall paper. In particular, as seen best in FIGS. 1 and 2, a hook member 94 is provided at the distal end of tape 16 and is secured to the end of the tape by rivet means 96a,96b and 96c. Actually, the hook member is of two parts, including a backing part 94a (FIG. 2). Rivets 96a,96b are substantially conventional and are used to rigidly sandwich the end of tape 16 between a leg 94b of hook 94 and backing part 94a. However, rivet 96c is a hollow rivet to provide an aperture 100 therethrough. This aperture provides means by which the tape can be hung onto a support structure, such as a common nail, and the casing 12, itself, can be moved downwardly against the drag afforded by first brake mechanism 38 to a desired measurement. As is known to even a common layman, it often is difficult to secure hook 94 over many surfaces. Not only can aperture 100 be used to securely hang the tape for measuring purposes, but the tape can be secured against lateral movement to scribe straight lines during carpentry work, or to hang the tape to scribe plumb lines, and for various other useful purposes.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A measuring tape device, comprising:
  a casing having an aperture through which a coilable measuring tape can be extracted and retracted;
  a coilable measuring tape disposed in the casing with a distal end projecting from the aperture;
  a first brake mechanism mounted on and normally recessed within the bounds of the casing for normally applying a controlled drag on the tape which allows the tape to be extracted or retracted against the drag to any given length and held at said length and being selectively operable to release the normal application of the controlled drag; and a second brake mechanism mounted on the casing and being selectively operable for applying a positive lock on the tape greater in magnitude than the drag of the first brake mechanism to prevent accidental extraction or retraction of the tape.

2. A measuring tape device, comprising:

a casing having an aperture through which a coilable measuring tape can be extracted and retracted;

a coilable measuring tape disposed within the casing with a distal end projecting from the aperture;

a first brake mechanism mounted on and normally recessed within the bounds of the casing for normally applying a controlled drag on the tape which allows the tape to be extracted or retracted against the drag to any given length and held at said length;

a second brake mechanism mounted on the casing and being selectively operable for applying a positive lock on the tape greater in magnitude than the drag of the first brake mechanism to prevent accidental extraction or retraction of the tape; and wherein said tape is spring loaded to be biased toward a retracted condition, said first brake mechanism including an actuator member exposed exteriorly of the casing and being spring biased toward and extended position wherein the drag is applied to the tape, the actuator being depressible against the spring bias to release the drag on the tape whereby the tape will retract automatically into the casing under the influence of its spring loading.

3. A measuring tape device, comprising:

a casing having an aperture through which a coilable measuring tape can be extracted and retracted;

a coilable measuring tape disposed in the casing with a distal end projecting from the aperture;

a first brake mechanism mounted on and normally recessed within the bounds of the casing and being selectively operable for applying a controlled drag on the tape which allows the tape to be extracted or retracted against the drag to any given length and held at said length;

a second brake mechanism mounted on the casing and being selectively operable for applying a positive lock on the tape greater in magnitude than the drag of the first brake mechanism to prevent accidental extraction or retraction of the tape; and wherein said casing is of a size and shape for grasping in the palm of a user's hand with the user's finger wrapped around a bottom area of the casing and the user's thumb overlying a top/front area of the casing, the first brake mechanism including an actuator exposed exteriorly of the casing in said bottom area, and the second brake mechanism including an actuator exposed exteriorly of the casing in said top/front area.

4. The measuring tape device of claim 3 wherein said tape is spring loaded to be biased toward a retracted condition, the actuator of the first brake mechanism being spring biased toward an extended position wherein the drag is applied to the tape, the actuator being depressible against the spring bias to release the drag on the tape whereby the tape will retract automatically into the casing under the influence of its spring loading.

5. The measuring tape device of claim 3 wherein said actuator of the second brake mechanism comprises a thumb button slidably mounted on the casing.

6. The measuring tape device of claim 3 wherein said actuator of the first brake mechanism comprises a lever pivotally mounted on the casing.

7. The measuring tape device of claim 6 wherein said actuator of the second brake mechanism comprises a thumb button slidably mounted on the casing.

8. A measuring tape device, comprising:

a casing having an aperture through which a coilable measuring tape can be extracted and retracted;

a coilable measuring tape disposed in the casing with a distal end projecting from the aperture;

means operatively associated between the casing and the tape and normally recessed within the bounds of the casing for normally applying a controlled drag on the tape and being selectively operable to release the normal application of the controlled drag; and a brake mechanism mounted on the casing and being selectively operable for applying a positive lock on the tape greater in magnitude than the drag of the means for applying a controlled drag on the tape, to prevent accidental extraction or retraction of the tape.

9. A measuring tape device, comprising:

a casing having an aperture through which a coilable measuring tape can be extracted and retracted, the casing having bottom wall means by which the device can be positioned on a supporting surface;

a brake mechanism on the casing and having a depressible actuator located exteriorly of the casing at said bottom wall means, whereby the actuator actuates the brake mechanism at a given point of depression of the actuator; and foot means projecting from the bottom wall means of the casing a distance at least to said given point of depression of the actuator to prevent depression of the actuator when the device is so positioned on the supporting surface.

10. The measuring tape device of claim 9 wherein said actuator compresses a lever pivotally mounted on the casing, said foot means being located near an end of the lever remote from its pivotal mounting.

* * * * *